INVENTOR
George J. Silvestri, Jr.

United States Patent Office 3,289,408
Patented Dec. 6, 1966

3,289,408
REGENERATIVE TURBINE POWER PLANT
George J. Silvestri, Jr., Morton, Pa., assignor to Westinghouse Electric Corporation, East Pittsburgh, Pa., a corporation of Pennsylvania
Filed June 22, 1964, Ser. No. 376,910
7 Claims. (Cl. 60—67)

This invention relates to a power plant having a turbine motivated by hot pressurized vapor, in which the feed liquid to the vapor generator is heated by motive vapor extracted from the turbine, and has for an object to provide an improved power plant of this type.

Vapor turbine power plants, in many instances, operate with large amounts of moisture formed by the motive vapor as it undergoes expansion in the turbine. This moisture causes erosion of the turbine blades and reduction in blade efficiency. Various moisture removal devices have heretofore been proposed to reduce the moisture level of the motive vapor. In conjunction with such devices, it has been found that the moisture removal effectiveness is improved, if some motive vapor is bled from the turbine jointly with the moisture.

When the power plant is of the regenerative type employing vapor extraction heaters for heating the feed liquid to the vapor generator, the stream of bleed vapor and entrained moisture is dumped to a lower pressure region, for example a feed liquid heater operating at a lower vapor pressure. Such an arrangement results in a loss in the available energy of the bleed vapor, since the bleed vapor is throttled to the lower pressure prevailing in the lower pressure region, and results in a reduction of the thermal efficiency of the turbine.

Vapor turbine power plants in which the motive vapor is generated by vapor generators heated by nuclear power, and power plants in which the motive vapor is not reheated after partial expansion in the turbine are primary examples of power plants in which turbine blade erosion and the above-described loss in efficiency due to moisture formation in the motive vapor occur, since the moisture content of the motive vapor may approach a value as high as 12% (by weight) of the motive fluid flow.

In view of the above, it is a further object to provide a vapor turbine power plant of the regenerative feed liquid heating type in which the pressure throttling losses of the motive vapor bled with the collected moisture are reduced, thereby enhancing the thermal efficiency of the power plant.

In a previously proposed steam power plant having a regenerative feed water heating cycle, it was proposed to split the feed water circuit to the steam generator into two streams and employ a plurality of feed water heaters in each stream. However, in this arrangement, each extraction steam opening in the turbine fed two adjacent feed water heaters, one in each stream. Hence, considering a pair of adjacent extraction openings, the temperature and pressure difference between adjacent feed water heaters in the same stream was the same as the temperature and pressure difference between adjacent heaters in both streams.

It was further found economically unjustifiable to double the number of feed water heaters in the above previously proposed arrangement, since doubling the number of heaters would halve the temperature difference between adjacent heaters in the same stream, and the total required heat transfer surface of the heaters would be increased by about 50%. That is, doubling the number of heaters and halving the temperature rise of the feed water through the heaters increased the required heat transfer surface by 50% with no increase in the terminal or final temperature of the feed water before admission to the steam generator. In a proposed 490 megawatt nuclear power plant, precise calculations indicated an increase in feed water heat exchange surface of about 60%.

With the invention, actual calculations of the same plant indicate an increase of about 9% in feed water heat exchange surface, when employing the same (doubled) number of feed water heaters, since the temperature difference between adjacent heaters in the same feed water stream is twice as great as with the previous proposal.

Accordingly, a further object is to provide a vapor turbine power plant of the regenerative feed liquid heating type, in which the number of feed water heaters may be increased with little increase in the required total heat exchange surface of the heaters.

A further object is to provide a vapor turbine power plant having a highly improved and efficient regenerative feed liquid heating system.

The motive vapor referred to above may be steam, ammonia or any other condensable vapor. However, for simplicity the vapor hereinafter will be referred to as "steam" and the liquid will be referred to as "water," since most vapor turbine power plants at this time employ steam as the motive vapor.

Briefly, the invention is employed in a vapor, for example, steam, turbine power plant having an exhaust condenser and a system for heating the feed water or condensate from the condenser before admission to the steam generator, which system includes at least one feed water heater heated by partially expanded steam extracted from the turbine. In accordance with the invention, there is provided a device within the turbine for collecting moisture carried by the partially expanded vapor in the turbine, and the device is interposed between an expansion stage in the turbine and the steam extraction opening for the feed water heater. Accordingly, the steam required to bleed the moisture and the steam required to heat the feed water heater are extracted at the same pressure and jointly delivered to the feed water heater. The feed water heater is thus operated at the same pressure as that of the bled steam required to remove the moisture from the turbine and, accordingly, the heretofore entailed yet undesirable pressure throttling loss of the moisture removing steam is eliminated.

It is desirable to remove as much moisture formed during expansion of the motive steam as economically feasible. Hence, the invention is generally highly advantageous in steam turbine power plants of the regenerative type having large power outputs from where the heat transferred to the feed water heating system is so large that a plurality of feed water heaters are employed utilizing steam extracted from the turbine at successively different pressures.

More particularly, the invention is highly advantageous in power plants of the above type having such large outputs that the heat transfer requirements for the feed water heating system are so great that the feed water circuit from the condenser to the steam generator may economically justify splitting the feed water circuit into at least two parallel streams and employing feed water heaters in each stream.

In accordance with a further important feature of the invention, in a vapor turbine power plant of the regenerative type employing at least two parallel feed water streams and feed water heaters in each stream, the steam is extracted from a plurality of successively lower pressure expansion stages in the turbine and the connections to the feed water heaters are so arranged that steam at successively lower pressure values is directed alternately to the feed water heaters in each stream. More particularly, the arrangement is such that the difference in steam pressure and temperature between adjacent feed water heaters in the same stream is about twice as great as the difference in steam pressure between adjacent heaters in both streams, thereby reducing the amount of heat exchanger surface required for each heater. To ensure that the feed water attains the same terminal temperature in both streams, however, the two highest pressure feed water heaters may be jointly fed by the highest pressure extraction steam. With this arrangement, moisture removal from the turbine may also be provided at each feed water heater extraction opening with no throttling loss penalty (heretofore imposed by moisture removal devices), thereby expeditiously and efficiently removing the moisture substantially as it collects.

The above and other objects are effected by the invention as will be apparent from the following description and claims taken in connection with the accompanying drawings, forming a part of this application, in which:

Figure 1:
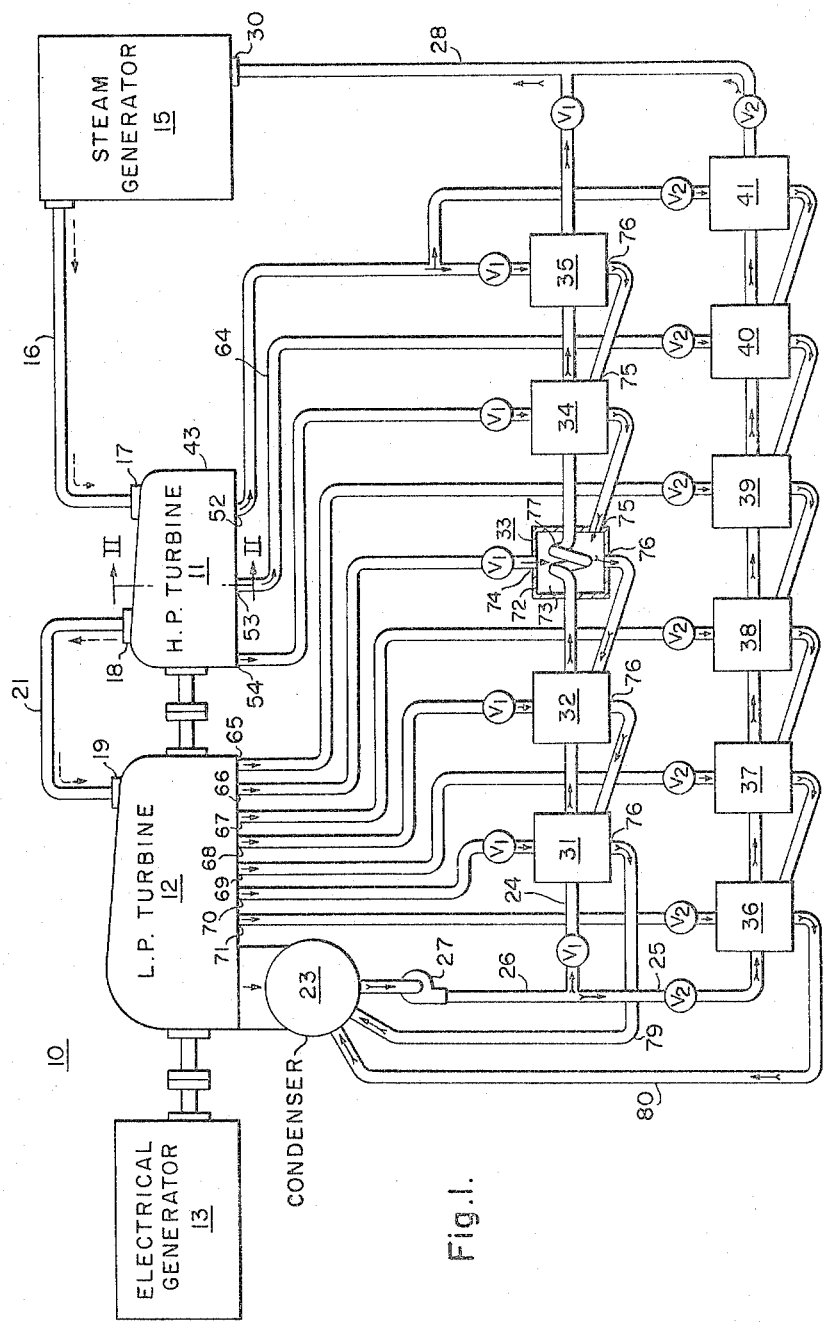
FIGURE 1 is a diagrammatic view of a steam turbine power plant system having the invention incorporated therein.

Referring to the drawings in detail, in FIG. 1 there is shown a multi-unit steam turbine power plant with regenerative feed water heat exchange system, generally indicated 10. Since power plants of the type to which this invention pertains are generally well known in the art, the components thereof are shown diagrammatically for facility of comprehension.

The power plant system includes an HP (high pressure) turbine unit 11, an LP (low pressure) turbine unit 12 and an electrical generator 13 or other suitable load driven jointly by the HP and the LP units 11 and 12. Although in the illustration shown, the HP and the LP units 11 and 12, respectively, are connected to each other in tandem and jointly drive a single electrical generator 13, they need not be connected to each other as illustrated and may be separated from each other to independently drive separate electrical generators or other separate suitable loads (not shown). Further, although only an HP unit and an LP unit have been shown for simplicity, more or less turbine units may be employed in the power plant system, as well known in the art.

The power plant system further comprises a suitable steam generator 15 for converting water into superheated motive steam for the HP unit 11 and the superheated steam thus generated in the generator 15 is delivered through a suitable conduit 16 to the inlet 17 of the HP unit 11 and is expanded to a lower value during flow therethrough with attendant motivation thereof. The steam is then withdrawn from the HP unit 11 through a suitable exhaust outlet 18 and delivered to the inlet 19 of the LP unit 12 by a suitable conduit 21, for further expansion in the unit 12. The HP and the LP units 11 and 12, as well known in the art, are of the axial flow multiple expansion types and hence provided with the usual plurality of steam expansion stages subsequently to be described.

After expansion in the LP unit 12, the exhaust steam therefrom is directed to a suitable exhaust condenser 23 and is condensed to form feed water which is subsequently returned to the steam generator 15 through a plurality of conduits 24 and 25. The conduits 24 and 25 are jointly connected at the upstream ends to a conduit 26 connected to the condenser and having a pump 27 disposed therein and, at the downstream ends, the conduits 24 and 25 are jointly connected to the conduit 28 which in turn is connected to the inlet 30 of the steam generator 15.

Since the system now about to be described in detail involves a multiplicity of conduits for conducting steam and for conducting condensate or water in specific directions, the directional arrows that are employed herein are of three types, namely, the arrows with a tail denote the direction and flow of condensate, the arrows without a tail denote the direction and flow of steam with entrained moisture, and the dotted arrows denote the direction and flow of motive steam.

The power plant system 10 further includes a regenerative system for heating the feed water condensed in the condenser 23 before admission to the steam generator 15. Since the feed water flow is divided into two streams by the conduits 24 and 25, the feed water in each stream is heated during flow therethrough by a plurality of feed water heaters utilizing extracted steam from the HP and the LP units 11 and 12, respectively. More particularly, the feed water in the first stream 24 is heated successively by feed water heaters 31, 32, 33, 34 and 35, while the feed water in the feed water stream 25 is heated by the feed water heaters 36, 37, 38, 39, 40 and 41.

Figure 2:
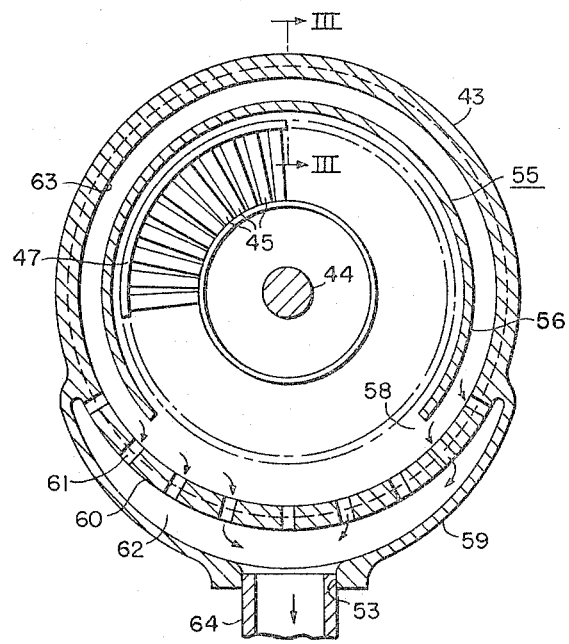
FIG. 2 is an enlarged sectional view taken on line II—II of FIG. 1, illustrating an arrangement for removing moisture from the motive steam.
Figure 3:
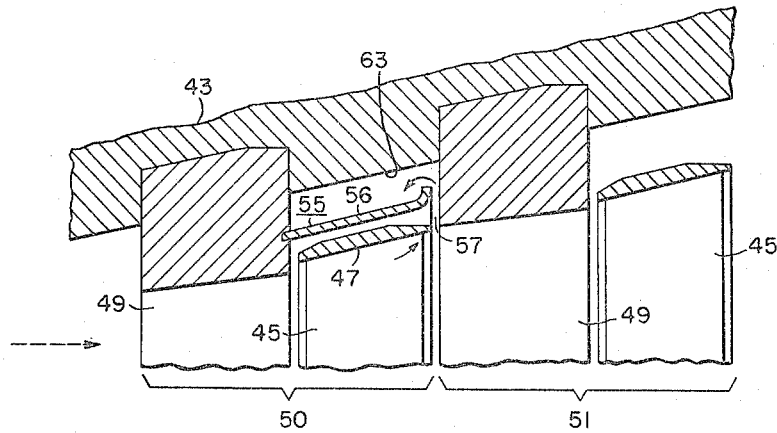
FIG. 3 is a further enlarged fragmentary sectional view taken on line III—III of FIG. 2.

The HP unit 11, as best illustrated in FIGS. 2 and 3, comprises an outer shell structure 43 within which is disposed a rotor 44 having a plurality of annular rows of rotatable blades 45, of suitable cross sectional configuration (not shown) and connected to each other by circular shroud structure 47. Each row of rotatable blades 45 is disposed downstream, with respect to steam flow, of an associated circular row of stationary nozzle blades 49 attached to the outer shell structure 43 and jointly constitute an expansion stage for the motive steam. Accordingly, FIG. 3 shows substantially two expansion stages 50 and 51. The shell structure 43 is provided with a plurality of extraction openings 52, 53 and 54 (see FIG. 1) for extracting steam therefrom and delivering the extracted steam to their respective feed water heaters 35, 40 and 33. The extraction opening 53 is associated with the expansion stage 50 and, in a similar manner, the extraction openings 52 and 54 are associated with other expansion stages (not shown). However, the extraction opening 52 extracts steam at a higher temperature and pressure value than opening 53 and the extraction opening 53 extracts steam at a higher temperature and pressure value than the extraction opening 54 since, as the steam flows from right to left through the HP unit 11, when viewed as in FIG. 1, the steam undergoes a series of expansions to successively lower values.

The expansion stage 50 is cooperatively associated with a moisture removing device or structure 55 of any suitable type. As illustrated, this structure includes an annular shield or deflector member 56 encompassing the shroud 47 and spaced radially outwardly therefrom to a small degree uniformly throughout its peripheral extent. The shield 56 is peripherally connected to the upstream nozzle blades 49 and is axially spaced from the downstream nozzle blades 49, thereby jointly defining a circumferential space 57. The shield member 56 may be discontinuous to provide an arcuate opening 58 in its lower portion as seen in FIG. 2. Further, the shell structure 43 may be provided with a double wall structure in its lower region including an outer wall portion 59 having the extraction opening 53 provided therein and an inner arcuate wall portion 60 disposed within the outer wall 59. The inner wall 60 has a plurality of aperture 61 and jointly with the outer wall 59 forms a chamber 62.

During operation, as the rotor 44 is rotatably driven by the force of the expanding steam flowing through the stages, the resulting expansion of the steam inherently condenses some of the steam into droplets of water and the rotating blade row 45 exerts centrifugal forces on the droplets of water and causes them to move radially outwardly around the shroud 47 and through the annular space 57 to the internal wall surface 63 of the shell 43. The space 57 is so proportioned that the required steam for extraction is bled from the stage 50 to the opening 53. The copious flow of extracted steam entrains and enhances removal of the liquid from the expansion stage 50 and directs it downwardly through the openings 61 to the chamber 62, and thence through the extraction opening 53, whence it is directed to the feed water heater 40 by a suitable conduit 64.

Since more steam is withdrawn from the stage 50 than is essential to remove the liquid droplets therefrom, the moisture removal is attained with a high degree of efficiency because of the large volume of steam flow provided for entraining the moisture during such removal. Hence, since the volume of steam heretofore required solely for removal of the moisture from the expansion stage is jointly removed with the extraction steam required to heat the associated feed water heater 40 and directed to the feed water heater 40 without the usual throttling losses, the energy in the thus extracted steam is fully utilized for heating the feed water.

Although not shown, it will be understood that moisture removal devices, such as the one described above in connection with the expansion stage 50 and the extraction opening 53, for example, are also provided in conjunction with the other HP unit expansion stages from which steam is extracted from the openings 52 and 54 for further heating the feed water before admission to the steam generator 15.

In a manner similar to the above, the LP unit 12 may be provided with a plurality of expansion stages for successively expanding the motive steam flowing therethrough, and a plurality of extraction openings 65, 66, 67, 68, 69, 70 and 71 associated with the stages for extracting steam for the associated feed water heaters in the feed water heating circuits 24 and 25. Here again, a suitable moisture removal device may be interposed between each extraction opening and the associated turbine expansion stage from which steam is extracted.

All of the feed water heaters 31 to 35, inclusive, and 36 to 41, inclusive, may be substantially identical. Hence, only the feed water heater 33 will be described in detail. Referring thereto, the feed water heater 33 is provided with an external shell structure 72 defining an internal space 73 and having a steam inlet opening 74, a water inlet 75, and a water outlet 76. The steam opening 74 is disposed in the upper portion of the shell 72, while the water openings 75 and 76 are disposed in the lower portion of the shell structure 72. Within the shell structure 73 there is provided a heat exchanger tube structure 77 interposed in the conduit 26 so that in operation, feed water flows through the tube structure 77 and is heated by steam admitted to the space 73 by the steam inlet 74 and, during the resulting heat exchange, the water in the tube 77 is heated with resulting condensation of the steam in the space 73. Such condensation drops to the lower region of the space 73 and is withdrawn through the outlet 76.

The steam extracted from the extraction openings 71 to 65, inclusive, and 54 to 52, inclusive, is alternately directed in ascending order to the feed water heaters in the first stream 24 and the second stream 25. Hence, the water through the first feed water stream 24 traverses the feed water heaters 31 through 35, inclusive, and is progressively heated from the condenser outlet temperature value to a terminal temperature value before admission to the steam generator by the conduit 28.

In a similar manner, the feed water in the feed water stream 25 flows through the feed water heater 36 through 41, inclusive, and is successively heated from the condenser outlet temperature to a terminal temperature, substantially equal to that of stream 24. More particularly, the extracted steam from the last and lowest temperature opening 71 is directed to the feed water heater 36 in the second stream 25, the next adjacent extraction opening 70 directs steam to the feed water heater 31 in the first stream 24, the next adjacent extraction opening 69 directs steam to the feed water heater 37, etc. Accordingly, the operating temperature differential between any two adjacent feed water heaters in either stream 24 or 25 is substantially twice as great as the temperature differential existing between any two adjacent feed water heaters in both streams 24 and 25. For example, the temperature differential between adjacent heaters 31 and 32 is substantially twice the temperature differential between heaters 31 and 37 or 32 and 37.

Although not entirely essential, it is desirable to heat the feed water in the streams 24 and 25 to the same terminal value before delivery to the conduit 28. Accordingly, it is desirable to split the extraction steam flow from the first and highest temperature extraction opening 52, so that steam is directed to the feed water heaters 35 and 41 at the terminal or downstream ends of the two feed water streams 24 and 25. Since the temperature rise between heaters 34 and 35 is twice as great as between heaters 40 and 41, heater 41 requires half as much heating steam as heater 35. Accordingly two thirds of the steam extracted from opening 52 is directed to the heater 35 and the remainder is directed to the heater 41.

The feed water heaters in the first stream 24 are connected "in cascade" with each other. More particularly, since the feed water heater 35 operates at the highest temperature and pressure value with respect to the other heaters in the stream 24, as the steam is condensed therein the condensate therefrom is withdrawn from the outlet 76 and is directed to the next higher temperature and pressure feed water heater 34 and admitted thereinto by the feed water opening 75 for further heat utilization of the heat therein. Accordingly, since the feed water heater 34 operates at a lower temperature and pressure level, the water admitted thereto from the feed water heater 35 flashes into steam and undergoes further heat exchange before recondensation. The remaining feed water heaters 34 through 31, inclusive, in the first feed water heating stream 24 are similarly connected so that their condensate drains 76 are connected to the condensate inlets 75 of the next and lower feed water heaters with attendant further heat utilization of the condensate.

The condensate from the feed water heater 31, which operates at the lowermost level, is directed through its condensate outlet 76 back to the condenser 23 by a suitable conduit 79 and then rejoins the condensate in the condenser and is directed through the conduit 26 as additional feed water for the steam generator 15.

In a similar manner, the feed water heaters 41 to 36, inclusive, are connected in cascade. That is, condensate flows from the heaters operating at a higher temperature and pressure level are directed into the next and adjacent lower level heaters for further heat utilization and, in a similar manner, the condensate from the lowermost feed water heater 36 is returned to the condenser 23 by a suitable conduit 80 and subsequently rejoins the feed water in conduit 26.

All of the steam extraction conduits leading from the extraction openings to their associated feed water heaters are preferably provided with suitable valves and, in a similar manner the feed water streams 24 and 25 are provided with suitable valves. More specifically, the valves in the extraction steam conduits feeding the feed water heaters 31 to 35, inclusive, and the valves in the feed water stream 24 are labeled V1, while the valves employed to control the extraction steam feeding the feed water heaters 36 to 41, inclusive, and the valves controlling the flow of feed water in the feed water stream 25 are labeled V2.

During operation, if for any malfunction reason one of the feed water heaters, such as 31 to 35, in the first stream becomes defective, the entire feed water stream 24 together with the feed water heater extraction circuits and the heaters 31 to 35, inclusive, may be deactivated by closing the valves V1, thereby interrupting the water flow through the feed water stream 24 and the extraction of steam to the feed water heaters. During such operation, all of the feed water from the conduit 26 will then flow through the feed water heating stream 25 and be heated by the feed water heaters 36 to 41, inclusive. This arrangement facilitates operation and permits operation of the system without requiring shutdown for repairs.

Conversely, if one of the feed water heaters 36 to 41, inclusive, should fail for any malfunction reason, the valves V2 may be closed thereby deactivating the second feed water stream 25 and the feed water heaters disposed therein, and during such operation, the feed water normally directed through the second stream 25 is directed through the first feed water stream 24.

With the embodiment described above, an overall decrease on the order of 0.34% to 0.66% in the heat rate of the power plant is attained. As well known, the heat rate is the amount of input energy required to yield a unit of power, for example B.t.u.'s at the steam generator to provide a kilowatt hour at the electric generator.

*Second embodiment*

Figure 4:
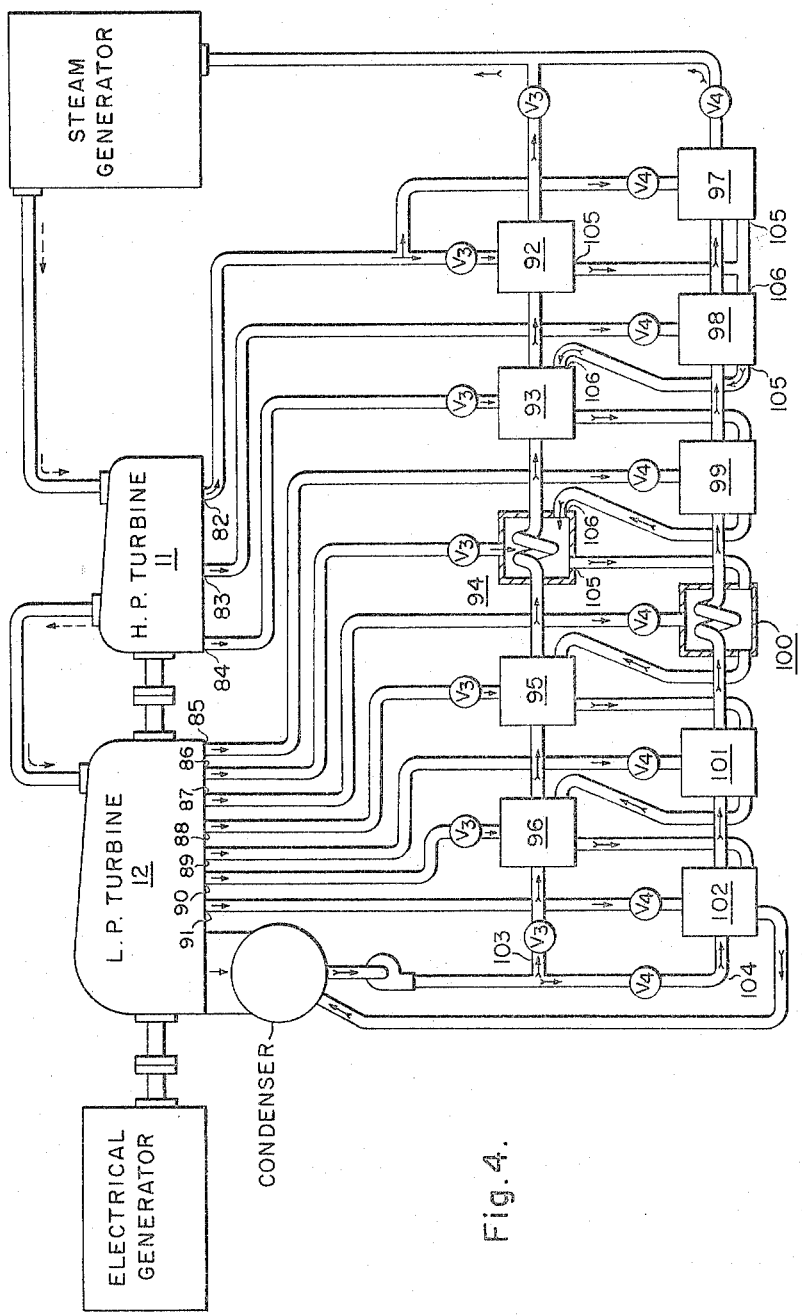
FIG. 4 is a diagrammatic view similar to FIG. 1, but showing a modified regenerative feed water heating system.

In FIG. 4 there is shown a modification of the system shown in FIG. 1 and described above. The modification of FIG. 4 in accordance with the invention, employs moisture removing devices in a similar manner to the HP unit 11 and the LP unit 12 already described in conjunction with FIG. 1 and shown in FIGS. 2 and 3. Here again, the moisture separating devices are employed in the same manner. Accordingly, adjacent each of the extraction openings 82 to 91, inclusive, there is provided a moisture separating device disposed between the opening and the associated extraction stage within the unit, so that the moisture, the steam for removing the moisture, and the steam for heating the feed water heaters 92 to 96 and the feed water heaters 97 to 102, inclusive, is jointly extracted. The heaters 92–96 are disposed in the first feed water heating stream 103, while the heaters 97–102 are disposed in the second feed water heating stream 104.

This arrangement also provides optimum moisture removal and utilization of the expanded steam without throttling during heat exchange in the feed water heaters to heat the feed water streams 103 and 104.

In this embodiment, steam and moisture from the first and highest temperature and pressure extraction opening 82 is preferably split into two streams and directed to the last feed water heater 92 in the feed water stream 103, and the last feed water heater 97 in the feed water stream 104. Here again, the feed water heaters alternate so that adjacent extraction openings alternately provide heating steam to adjacent heaters in each of the feed water streams; for example, heaters 102, 96 and 96, 101, etc., and adjacent heaters in the same stream, for example, 96, 95 and 102, 101, etc., are heated by steam from alternately spaced extraction openings in the turbine units. Therefore, as in the first embodiment, the differential in temperature and pressure between adjacent heaters in the same stream is twice as great as between adjacent heaters in both streams. Further, the condensate drain outlets 105 and the condensate inlet openings 106 in each of the feed water heaters are similar to the outlets 76 and the inlets 75 in the feed water heaters described in FIG. 1. However, in this embodiment the drain outlets 105 from the feed water heaters in one feed water stream are connected to the inlets 106 of the feed water heaters in the other feed water stream, so that the condensate from the entire feed water heating system is cascaded in series from one stream 103 to the other stream 104. That is, the condensate from the feed water heater 92 is directed to the feed water heater 98 in the stream 104, while the drain 105, from the feed water heater 98 is directed to the inlet 106 in the feed water heater 93 in the feed water stream 103, etc. Since the two last heaters 92 and 97 operate at the same temperature, the condensate from the heater 97 is also directed to the heater 98.

This arrangement is somewhat more efficient with regard to the utilization of the heat in the condensate drains from the heaters, since the condensate from one heater to the next entails a slightly less throttling loss because the operating level of the lower temperature heater in the next stream in the cascade series is only one-half as great as in the first embodiment.

Here again, a set of valves V3 may be employed to control the flow of feed water in the first feed water stream 103 and the extraction steam to heat the feed water heaters in the first feed water stream 103. In the second feed water stream 104 a plurality of valves V4 are employed for controlling the extraction steam flow to the feed water heaters therein and feed water flow therethrough.

Although the system shown in FIG. 4 is more efficient thermodynamically than that shown in FIG. 1, it is not as flexible as the system shown in FIG. 1. For example, in the event of failure of any one of the feed water heaters, whether in the first feed water stream 103 or the second feed water stream 104, the entire system would have to be shut down, since the feed water heaters in both feed water streams are connected to each other by the cascading arrangement described above.

With the above described embodiment, an overall decrease on the order of about 0.44% to 0.76% in the heat rate of the power plant is attained.

It will now be seen that the invention provides a highly improved arrangement for removing condensate from a vapor power plant without the heretofore entailed throttling losses of the vapor required to promote the removal of the condensate from the turbine units.

It will further be seen that the invention provides a highly improved regenerative feed water heating system for a vapor power plant, wherein the vapor employed to heat the feed liquid to the vapor generator is utilized with a high degree of efficiency and although a large number of feed water heaters is employed in the two systems shown, in accordance with the invention the feed water heaters may be made smaller than heretofore and thus individually less expensive. Hence, even though the total number of heaters is larger than heretofore deemed desirable with plants of the type to which the invention relates, the additional cost of the heaters is well justified because of the increase in operating efficiency of the plant, which efficiency more than offsets the initial cost of the system.

Although several embodiments of the invention have been shown, it will be obvious to those skilled in the art that it is not so limited, but is susceptible of various other changes and modifications without departing from the spirit thereof.

I claim as my invention:
1. A regenerative turbine power plant comprising
 a vapor turbine having a plurality of vapor expansion stages,
 vapor generating means for providing pressurized vapor to said turbine,
 a condenser for condensing the exhausted vapor from said turbine,
 means including a pair of conduits connected in parallel for dividing the condensation from said condenser into two streams and directing the condensate to said vapor generating means as feed liquid,
 at least a pair of feed liquid heaters interposed one in each of said conduits,
 first and second extraction conduits for extracting partially expanded vapor from at least one expansion stage of said turbine and directing the partially expanded vapor to said feed liquid heaters,
 means associated with said one expansion stage for collecting moisture carried by the partially expanded vapor in said turbine, said collector means having an outlet for bleeding said moisture from said turbine, and at least one of said extraction conduits being connected to said outlet, whereby the collected moisture is bled from said turbine jointly with the extracted vapor.

2. A regenerative turbine power plant comprising a vapor turbine having a plurality of vapor expansion stages, vapor generating means for providing pressurized vapor to said turbine, a condenser for condensing the exhausted vapor from said turbine, means including first and second conduits connected in parallel for dividing the condensate from said condenser into two streams and directing the condensate to said vapor generating means as feed liquid, a first pair of feed liquid heaters and a second pair of feed liquid heaters interposed in said first and second conduits, respectively, a first pair of extraction conduits and a second pair of extraction conduits for extracting partially expanded vapor from said stages at successively lower pressures, said first pair of extraction conduits being individually connected to one of said first and one of said second pairs of heaters, and said second pair of extraction conduits being individually connected to the other of said first and the other of said second pairs of heaters.

3. The structure recited in claim 2 in which each of said heaters is provided with a shell having a drain for the condensate formed by the extracted vapor, the drains from the downstream heaters in the first and second conduits are connected to the upstream heaters in the same conduits, respectively, and the drains from the upstream heaters are connected to the condenser.

4. The structure recited in claim 2 in which each of said heaters is provided with a shell having a drain for the condensate formed by the extracted vapor, the drain from the downstream heater in the first conduit is connected to the downstream heater in the second conduit, the drain from the downstream heater in the second conduit is connected to the upstream heater in the first conduit, and the drain from the upstream heater in the first conduit is connected to the upstream heater in the second conduit.

5. A regenerative turbine power plant comprising a vapor turbine having a plurality of vapor expansion stages, vapor generating means for providing hot pressurized vapor to said turbine, said vapor expansion stages having individual means for collecting moisture carried by the progressively expanded vapor in said stages, a condenser for condensing the exhausted vapor from said turbine, means including a pair of conduits connected in parallel for dividing the condensate from said condenser into two streams and directing the condensate to said vapor generating means as feed liquid, a plurality of feed liquid heaters interposed in said first and second conduits and an equal plurality of extraction conduits for extracting partially expanded vapor from said expansion stages, asid extraction conduits being connected at one end to said moisture collecting means in successively pressure decreasing order and alternately to the heaters in each of said pair of conduits in upstream feed liquid flow order.

6. The structure recited in claim 5 in which each of the heaters is provided with a shell having a drain outlet for the condensate formed by the extracted vapor, the drains from the heaters in one of the pair of conduits are connected in cascade to their neighboring heaters and the condenser, and the drains from the heaters in the other of the pair of conduits are connected in cascade to their neighboring heaters and the condenser.

7. The structure recited in claim 5 in which each of the heaters is provided with a shell having a drain outlet for the condensate formed by the extracted vapor, and the drains from the heaters in one of the pair of conduits are connected in cascade alternately with their neighboring heaters in the other of the pair of conduits and the condenser.

References Cited by the Examiner
UNITED STATES PATENTS

| 1,679,519 | 8/1918  | Frey  | 253—76   |
| 2,292,291 | 8/1942  | Roe   | 253—76 X |
| 2,332,322 | 10/1943 | Kraft | 253—76   |

FOREIGN PATENTS 1,239,764  7/1960  France.

MARTIN P. SCHWADRON, *Primary Examiner.*

ROBERT R. BUNEVICH, *Examiner.*